United States Patent
Beasley

(10) Patent No.: US 8,781,749 B2
(45) Date of Patent: Jul. 15, 2014

(54) ATTENUATING NOISE IN SEISMIC DATA

(75) Inventor: Craig Beasley, Houston, TX (US)

(73) Assignee: WesternGeco L.L.C., Houston, TX (US)

(*) Notice: Subject to any disclaimer, the term of this patent is extended or adjusted under 35 U.S.C. 154(b) by 355 days.

(21) Appl. No.: 11/966,490

(22) Filed: Dec. 28, 2007

(65) Prior Publication Data
US 2009/0171588 A1 Jul. 2, 2009

(51) Int. Cl.
*G01V 1/28* (2006.01)
*H04B 1/12* (2006.01)
*G01V 1/48* (2006.01)

(52) U.S. Cl.
USPC ............ 702/17; 702/14; 702/191; 367/38; 367/39; 367/40; 367/43; 367/73

(58) Field of Classification Search
USPC ............ 702/14, 17, 191; 367/38–40, 73, 43
See application file for complete search history.

(56) References Cited

U.S. PATENT DOCUMENTS

| | | | |
|---|---|---|---|
| 3,638,178 A * | 1/1972 | Stephenson | 367/71 |
| 4,979,150 A * | 12/1990 | Barr | 367/24 |
| 4,992,995 A * | 2/1991 | Favret | 367/43 |
| 5,448,531 A | 9/1995 | Dragoset, Jr. | |
| 5,745,392 A * | 4/1998 | Ergas et al. | 708/203 |
| 5,920,828 A * | 7/1999 | Norris et al. | 702/14 |
| 6,629,037 B1 * | 9/2003 | Nyland | 702/14 |
| 6,668,228 B1 | 12/2003 | Ozbek et al. | |
| 6,989,841 B2 * | 1/2006 | Docherty | 345/629 |
| 7,292,943 B2 * | 11/2007 | Elder et al. | 702/14 |
| 2003/0055569 A1 * | 3/2003 | Shatilo et al. | 702/17 |
| 2004/0013037 A1 * | 1/2004 | Vaage | 367/21 |
| 2004/0049347 A1 * | 3/2004 | Fookes et al. | 702/14 |
| 2004/0054479 A1 | 3/2004 | Trickett | |
| 2005/0027454 A1 | 2/2005 | Vaage et al. | |
| 2006/0239117 A1 * | 10/2006 | Singh et al. | 367/20 |
| 2007/0041271 A1 | 2/2007 | Lecerf | |
| 2007/0064535 A1 * | 3/2007 | Burnstad | 367/73 |

OTHER PUBLICATIONS

Ray Abma, FX-Decon, Website at http://sepwww.stanford.edu/public/docs/sep77/ray1/paper_html/node2.html, Stanford Exploration Project, 1997.
Olivares Letter re MX Official Action, dated Mar. 15, 2011, Application No. MX/a/2008/016129.
Extended Search Report of European Patent Application No. 08172846.1 dated Feb. 8, 2012: pp. 1-7.

* cited by examiner

*Primary Examiner* — Michael Nghiem
*Assistant Examiner* — Alexander Satanovsky

(57) ABSTRACT

Noise may be filtered or attenuated from seismic data by building a four-dimensional volume using the acquired seismic data and then applying a random noise attenuation filter to the four-dimensional volume. The dimensions of the four-dimensional volume may include a trace number dimension, a time dimension, a shot number dimension, and a cable number dimension. The random noise attenuation filter may filter portions of the acquired seismic data if the seismic data is not correlated with respect to other seismic data in the four dimensional volume.

20 Claims, 9 Drawing Sheets

ATTENUATING NOISE IN SEISMIC DATA

BACKGROUND

1. Field of the Invention

Implementations of various technologies described herein generally relate to methods and systems for attenuating noise in seismic data.

2. Description of the Related Art

The following descriptions and examples are not admitted to be prior art by virtue of their inclusion within this section.

Implementations of various technologies described herein generally relate to methods and systems of processing seismic data. Seismic data may be acquired in a seismic survey. In a seismic survey, a source may be activated to generate energy, which may be reflected back by the earth's sub-surface layers. The resultant seismic wavefields may be sampled by an array of seismic receivers disposed at a distance from the seismic source. Each receiver may be configured to acquire seismic data, which is normally in the form of a record representing the value of some characteristic of the seismic wave field against time. The data received by a receiver and then recorded are collectively called a seismogram. Information about the earth's sub-surface can be obtained from the acquired seismic data.

In addition to information about the earth's sub-surface, the acquired seismograms or records may contain noise. The noise may reduce the accuracy of the information about the earth's sub-surface obtained or derived from the seismic data. The noise may come from various sources. For example, noise may be acquired in marine seismic data acquisition due to waves propagating along streamers used during marine seismic data acquisition. Noise may also be acquired during land seismic data acquisition from sources such as ground-roll or air-waves.

In some circumstances, a portion of the noise may be filtered from a record and the resulting filtered record may be used to obtain information about the earth's sub-surface. Using a filtered record, rather than an unfiltered record, may increase the accuracy of the information about the earth's sub-surface derived from the records.

Although noise filtering may attenuate some of the noise from a record, the level of attenuation, or the amount of noise filtered from the record may not be sufficient. That is, the filtered record may still contain some noise, and thus the filtered record may not increase the accuracy of the information regarding the earth's sub-surface to an acceptable level. Therefore, there exists a need for methods or systems designed to reduce more noise or do a better job of attenuating noise from seismic data.

SUMMARY

Described herein are implementations of various technologies for attenuating noise in seismic data.

According to one implementation, a method for attenuating noise in seismic data is provided. The method generally includes: acquiring the seismic data; forming a four-dimensional volume using the seismic data, the four-dimensional volume having trace number as a first dimension, having time as a second dimension, having shot number as a third dimension, and having cable number as a fourth dimension; and applying a random noise attenuation filter to the four-dimensional volume.

According to another implementation, a computer readable medium containing a program is provided. When executed, the program performs operations that include: acquiring seismic data; forming a four-dimensional volume using the seismic data, the four-dimensional volume having trace number as a first dimension, having time as a second dimension, having shot number as a third dimension, and having cable number as a fourth dimension; and applying a random noise attenuation filter to the four-dimensional volume.

According to yet another implementation a computer system is provided. The computer system includes: a processor; and memory comprising program instructions executable by the processor to: acquire seismic data; form a four-dimensional volume using the seismic data, the four-dimensional volume having trace number as a first dimension, having time as a second dimension, having shot number as a third dimension, and having cable number as a fourth dimension; and apply a noise attenuation filter to the four-dimensional volume.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

Implementations described herein provide techniques and devices for filtering noise from seismic data. In one implementation, noise may be filtered or attenuated from seismic data by building a four-dimensional volume using the acquired seismic data and then applying a random noise attenuation filter to the four-dimensional volume. The dimensions of the four-dimensional volume may include a trace number dimension, a time dimension, a shot number dimension, and a cable number dimension. The random noise attenuation filter may filter portions of the acquired seismic data if the seismic data is not correlated with respect to other seismic data in the four dimensional volume.

Although implementations of various technologies described herein to filter or attenuate noise from seismic data may be described with reference to marine seismic surveys and marine seismic acquisition survey systems, it should be understood that the technologies described herein may filter noise from seismic data acquired using land based seismic surveys and land based seismic acquisition systems, borehole systems and bottom referenced systems or any other type of seismic survey or seismic acquisition system.

Figure 1A:
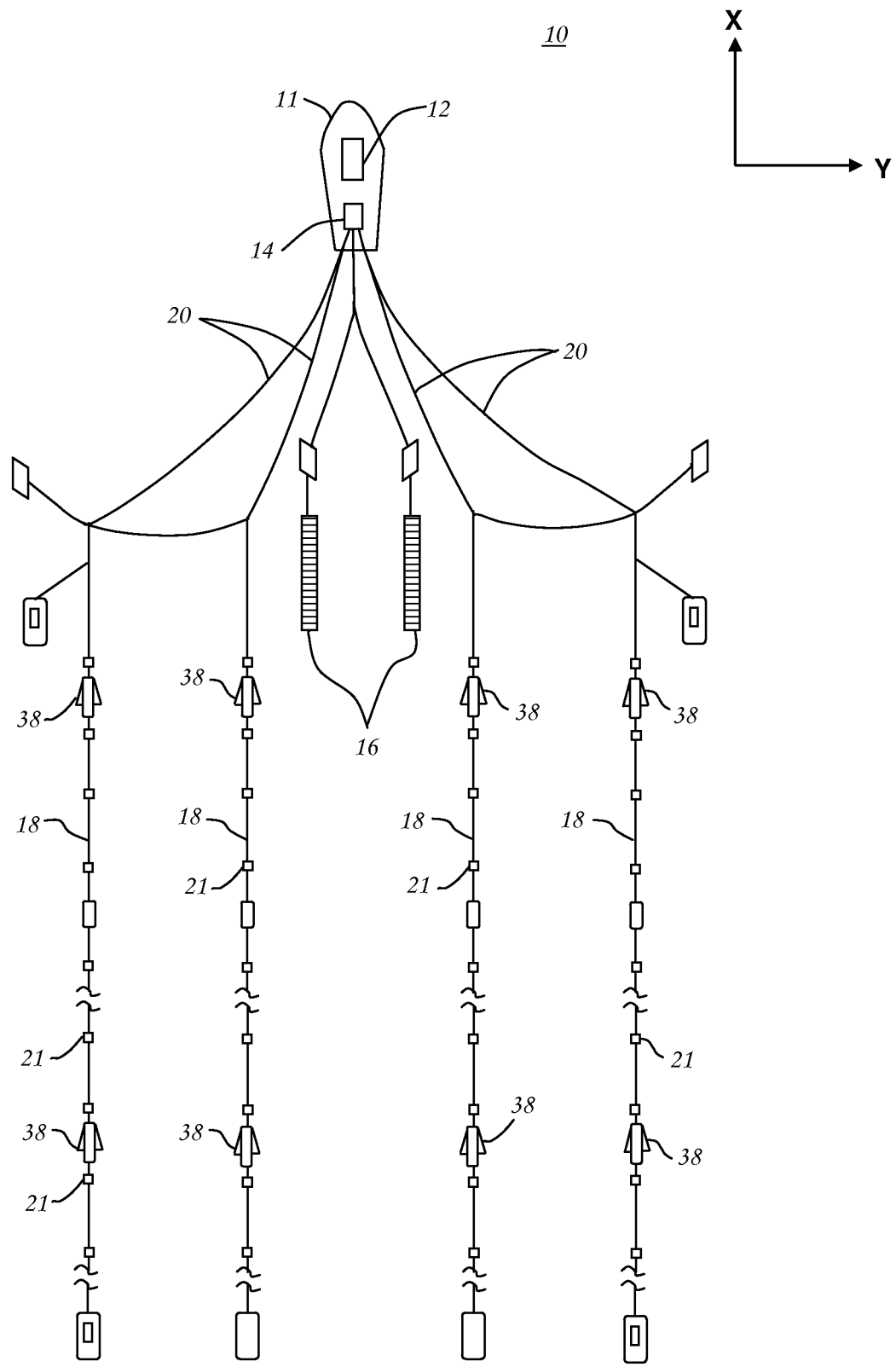
FIGS. 1A and 1B illustrate a typical marine seismic acquisition survey system for acquiring seismic data.
Figure 1B:
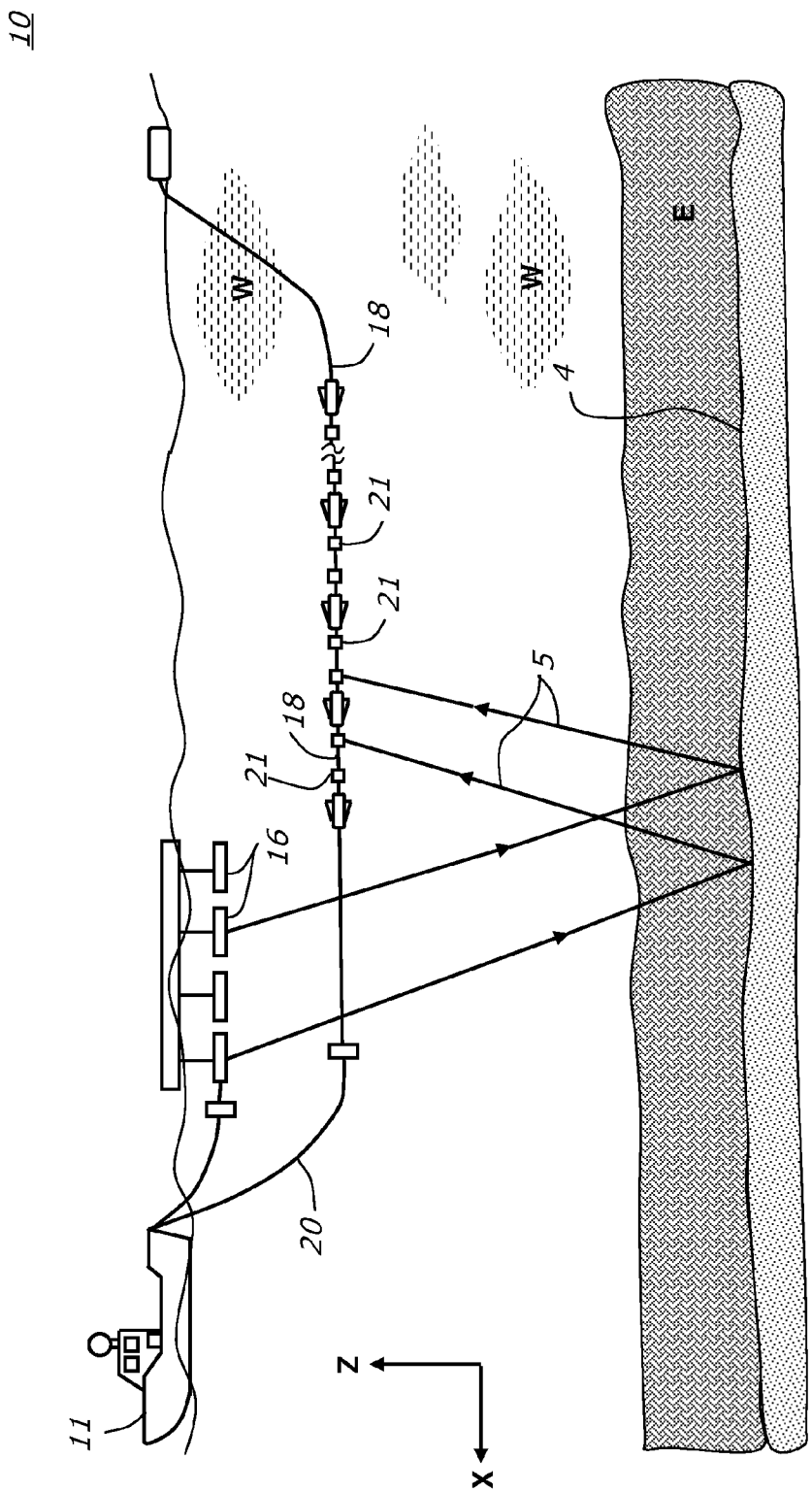

FIGS. 1A and 1B illustrate a typical marine seismic acquisition survey system 10 for acquiring seismic data. For purposes of clarity and simplicity, where marine seismic survey is discussed, positive X direction is the direction where the towing vessel is going. With reference to FIG. 1A, the Y direction is the horizontal direction perpendicular to the X direction. The Y direction may also be referred to as cross-line direction. With reference to FIG. 1B, the positive Z direction is a vertical-up direction. For clarity, when referring to an airgun or similar single source, the word source will be used. When referring to a plurality of sources used collectively as a single source, the words source group will be used. When referring to a line of sources towed by a vessel, the words source array will be used.

The typical marine seismic acquisition system 10 may include a vessel 11 carrying control components 14 and towing a plurality of seismic sources 16 and a plurality of cables or streamers 18 equipped with seismic receivers 21. The vessel 11 may further include a GPS receiver 12 coupled to the control components 14, which may be an integrated computer-based seismic navigation (TRINAV™), source controller (TRISOR™), and recording (TRIACQ™) system (collectively, TRILOGY™). The seismic sources 16 may be made of the same types of sources, or they may be made of different types of sources. The sources may be any type of common seismic generator, such as air guns, water guns, steam injection sources, explosive sources such as dynamite or gas injection followed by detonation and the like. The streamers 18 may be towed by means of their respective lead-ins 20, which may be made from high strength steel or fiber-reinforced cables that convey electrical power, control, and data signals between the vessel 11 and the streamers 18. Each streamer 18 may include a plurality of seismic receivers 21, distributed at spaced intervals along the streamer's length. Each receiver 21 may be a hydrophone sensor, a velocity sensor, an accelerometer, or combinations thereof. Each receiver 21 may be separately wired so that its output signal can be separately digitized and/or filtered, thereby permitting sophisticated processing known as digital group forming, as described in commonly assigned U.S. Pat. No. 6,684,160 or they may be wired in groups commonly known as arrays. Further, the streamers 18 may include a plurality of inline streamer steering devices (SSDs) 38, also known as "birds," such as Q-FIN™ birds of the kind described in commonly assigned U.S. Pat. No. 6,671,223. The SSDs may be distributed at appropriate intervals along the streamers 18 for controlling the streamers' depth and lateral movement.

During acquisition, the seismic sources 16 and the seismic streamers 18 may be deployed from the vessel 11 and towed very slowly, for example about 5 knots. The seismic sources 16 may be periodically activated, for example every 10-15 seconds or so, emitting seismic energy in the form of an acoustic wave through the water. Each source 16 may be activated independently or simultaneously with other sources, and the action of activating a seismic source may be referred to as firing a shot. The acoustic wave emitted by the source may result in one or more wavefields that travel coherently into the earth E underlying the water W (see FIG. 1B). As the wavefields strike interfaces 4 between earth formations, or strata, they may be reflected back through the earth E and water W along paths 5 to the various receivers 21 where the wavefields (e.g., pressure waves in the case of air gun sources) may be converted to electrical signals, digitized and transmitted to the integrated computer-based seismic navigation, source controller, and recording system 14 (see FIG. 1A) in the vessel 11 via the streamers 18 and lead-ins 20. Through analysis of these detected signals (seismic records or seismic traces), it may be possible to determine the shape, position and lithology of the sub-sea geology, including those formations that may likely contain hydrocarbon deposits.

Method of Attenuating Noise in Seismic Data

As described above, the seismic data (seismic records) may contain information which can be used to determine the sub-sea or sub-surface geology. Unfortunately, the seismic records may also contain noise generated by various other sources within the vicinity of the receivers 21. As such, various implementations described herein provide techniques for attenuating the noise in the seismic records.

Figure 2:
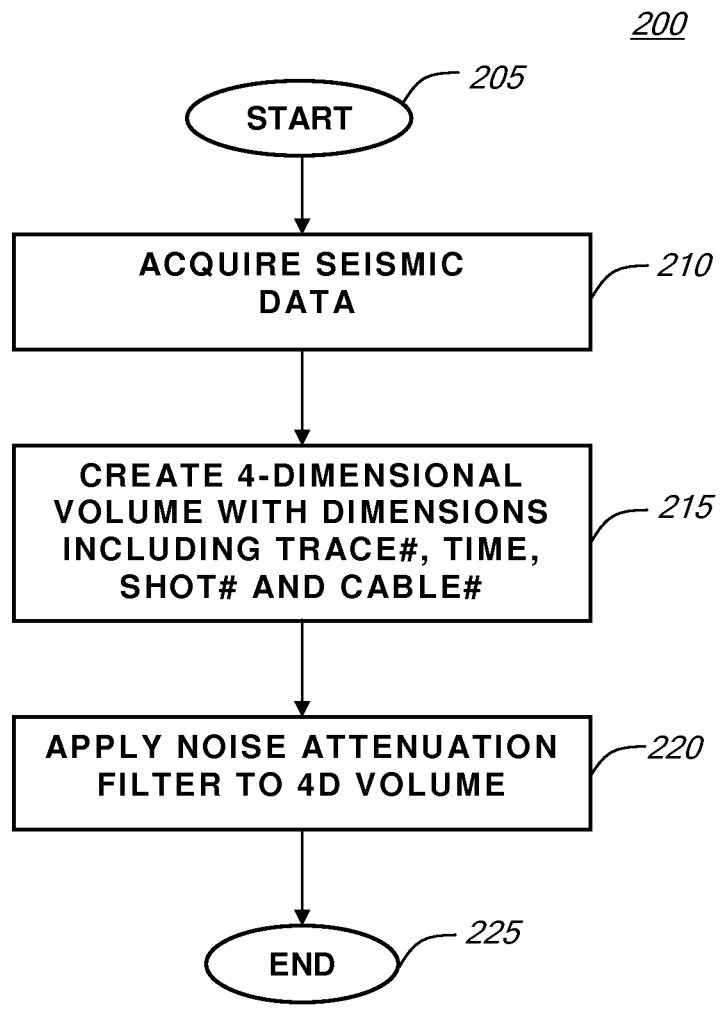
FIG. 2 is a flow diagram which illustrates an exemplary method of attenuating noise in seismic data, in accordance with implementations of various technologies described herein.

FIG. 2 is a flow diagram which illustrates a method 200 for attenuating noise in seismic data according to implementations of various techniques described herein. Method 200 may begin at step 205 for example when a seismic survey commences. Then, at step 210 seismic data may be acquired.

The seismic data may be acquired via any available means. For example, seismic data may be acquired using a land based seismic data acquisition system, a marine based seismic data acquisition system, or using an ocean bottom cable seismic data acquisition system. In a marine seismic data system, the seismic data may be acquired using the vessel 11 and cables or streamers 18 as described above with respect to FIGS. 1A and 1B.

Seismic records (seismic traces) may be acquired by activating a seismic source 16 (firing a shot) and using receivers 21 to record wavefields generated in response to the activation of the seismic source. Each receiver 21 along the seismic streamers 18 may detect and record a separate seismic record in response to the firing of a shot. In order to acquire seismic data for a large area, a seismic survey may be conducted which may include firing a plurality of shots at various locations within the area or near the area.

Figure 3:
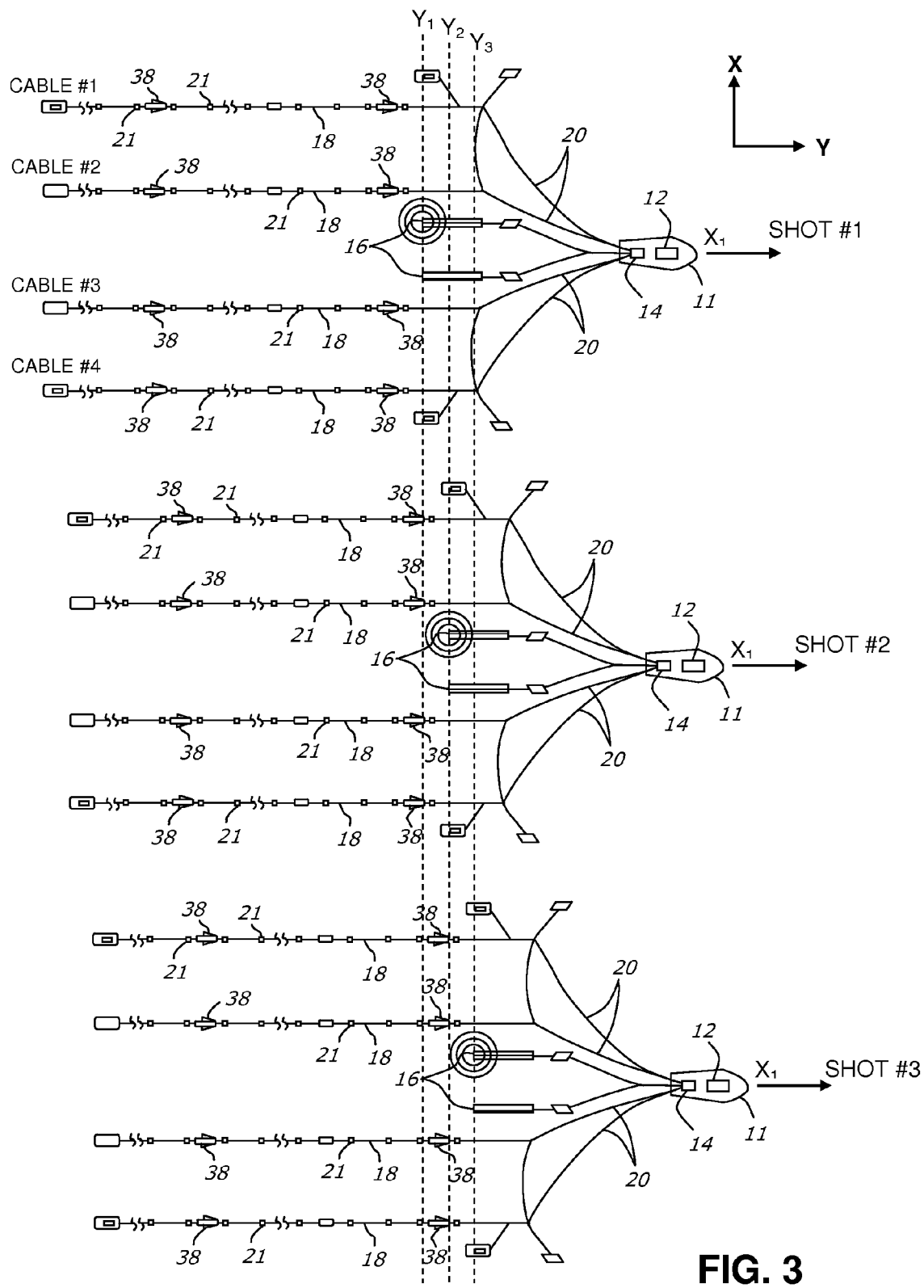
FIGS. 3 and 5 illustrate exemplary seismic surveys, in accordance with implementations of various technologies described herein.

For example, FIG. 3 illustrates an exemplary seismic survey of an area using a marine seismic acquisition system 10. During the seismic survey of the area, the vessel 11 may travel along a predetermined path $(x_1)$ in the y-direction and fire a first shot (shot number 1) at a first location $y_1$. The firing of the first shot is illustrated in FIG. 3 by the concentric circles emanating from the source 16 at location $y_1$. Each receiver 21 in each streamer or cable (e.g., cable number 1, cable number 2, cable number 3, and cable number 4) may then record wavefields generated in response to the first shot in order to create seismic records (seismic traces). The receivers 21 may record the wavefields for a predetermined amount of time (e.g., approximately 10-15 seconds).

The seismic records may be stored along with information which identifies a receiver which received the seismic record (e.g., a trace number or receiver number). Furthermore, the seismic records may also be stored with information which identifies the time the seismic record was recorded and the timing of the seismic record itself. Additionally, the seismic records may also be stored with information which identifies the shot number which was fired in order to create the wavefields. The shot number may be information which identifies the shot with respect to other shots which are fired during the seismic survey (e.g., first shot, second shot, third shot, etc.). The term "shot number" may also denote a vector of locators such as surface position of the shot, time of the shot, date and the like. The seismic records may also be stored with information which identifies the cable on which the receiver which received the seismic record was located (e.g., a cable number). The terms "cable number" and "trace number" may also denote a vector or vectors of locators, such as the surface position of a receiver or receivers which received the seismic record.

Figure 4:
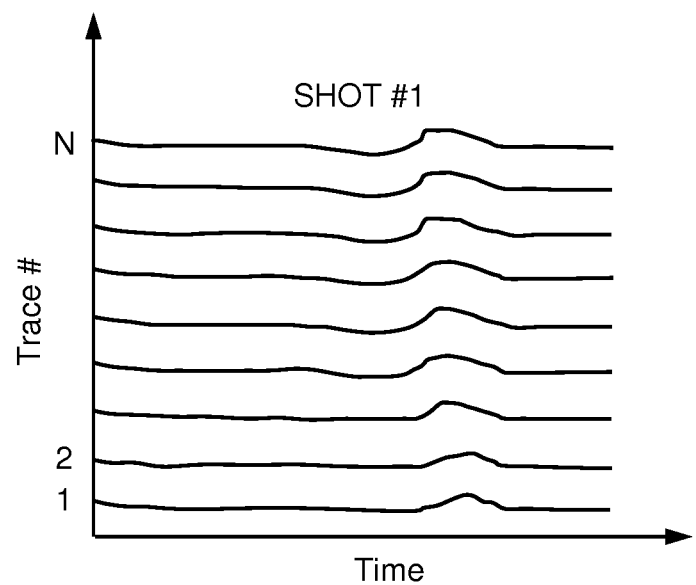
FIGS. 4, 6, and 7 illustrate exemplary seismic data, in accordance with implementations of various technologies described herein.

FIG. 4 illustrates a shot gather 400 or gathering of seismic records/traces which were recorded in response to the firing of the first shot (shot number 1). In the shot gather 400 a number of seismic traces (seismic records) represented by the letter N are arranged along the vertical-axis according to a trace number, and are plotted with respect to time along the horizontal-axis of the shot gather. The N seismic records or seismic traces may have been recorded by N receivers within a cable (e.g., cable number 1) towed behind the vessel 11. The trace number assigned to each seismic trace may correspond to a receiver in the cable which received the wavefields generated in response to the firing of a shot.

Referring back to FIG. 3, sometime after the first shot has been fired, a second shot (shot number 2) may be fired from the seismic source at a second location ($y_2$) along the predetermined path ($x_1$). The firing of the second shot is illustrated in FIG. 3 by the concentric circles emanating from the source 16 at location $y_2$. Each receiver 21 in each cable may then record wavefields for an amount of time after the second shot has been fired in order to capture more seismic traces which contain reflected wavefields. Furthermore, the vessel 11 may continue along the predetermined path ($x_1$) firing shots at more predetermined locations (e.g., $y_3$), and the receivers 21 may record the resulting wave fields to generate seismic traces. The seismic survey may include firing a predetermined number of shots represented by the letter M.

According to one implementation, the predetermined locations where the source is fired may be equidistant locations along the predetermined path. For example, $y_1$, $y_2$ and $y_3$ may each be 25 meters apart along a straight line (e.g., $x_1$). Thus, one seismic survey for an area may be to activate a seismic source every 25 meters along a predetermined straight line path $x_1$ and record the resulting wave fields using the receivers 21.

Figure 5:
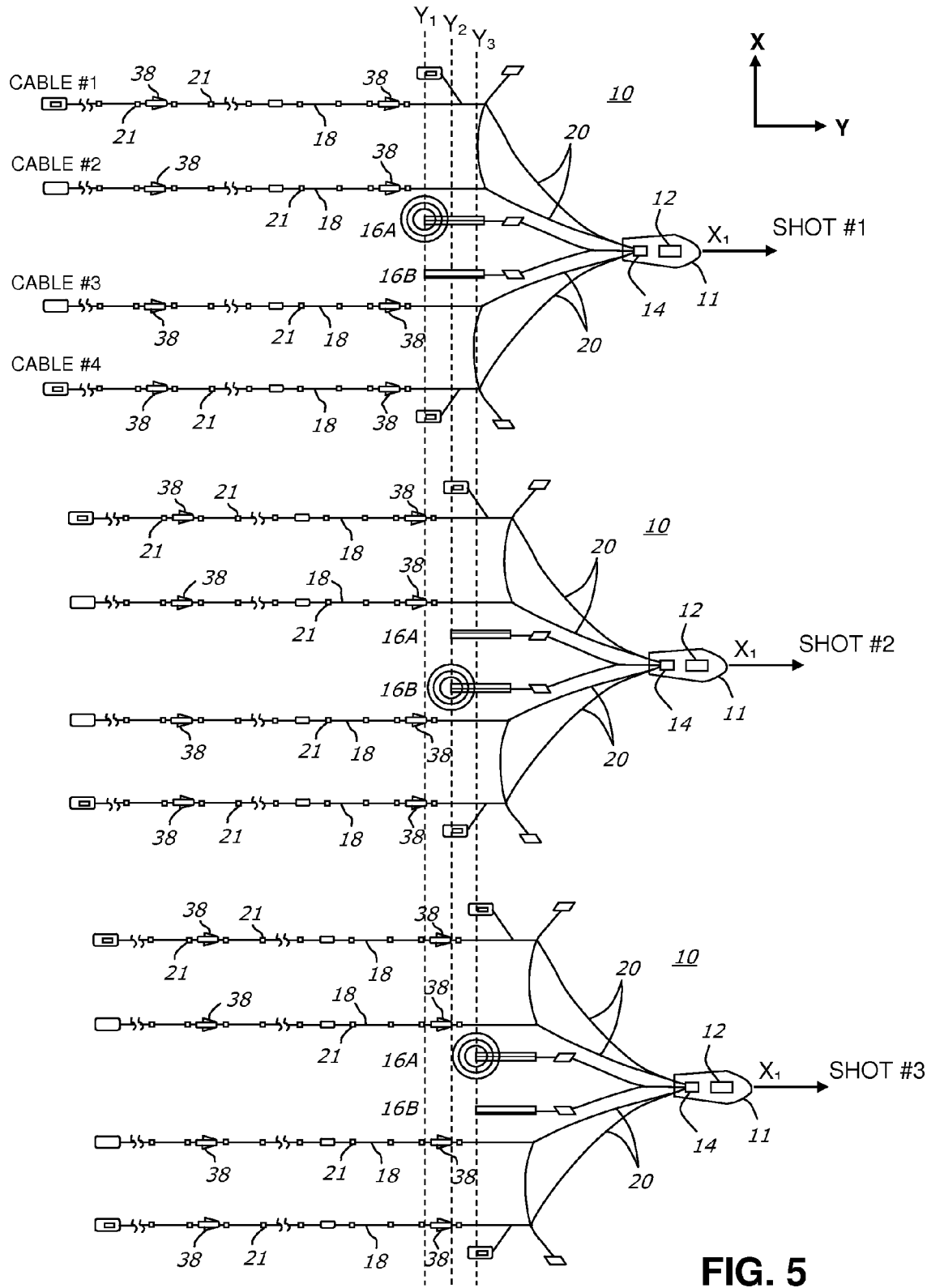

However, it should be understood that the predetermined path and/or predetermined locations for firing the shots may not be in a straight line. For example, FIG. 5 illustrates another exemplary seismic survey for an area in a marine environment. Similar to FIG. 3, the vessel 11 may travel along a predetermined path $x_1$ and may fire shots at equidistant locations in the positive y direction (e.g., at locations $y_1$, $y_2$, and $y_3$). However, in contrast to FIG. 3, the shots may be fired from alternating sources (i.e., source 16A and source 16B). As illustrated in FIG. 5, the first shot may be fired at location $y_1$ from source 16A, the second shot may be fired at location $y_2$ from source 16B, and the third shot may be fired at location $y_3$ from source 16A. Furthermore, as illustrated in FIG. 5, the source 16A and the source 16B may be separated some distance in the x-direction. Consequently, alternating the firing of shots between source 16A and source 16B may result in a zigzag pattern of shots along the predetermined path $x_1$. Moreover, the trajectory of the vessel need not be linear. For example the trajectory of the vessel may be curved or even circular. These techniques for firing shots during a seismic survey may also result in the gathering of seismic data containing information related to the sub-sea geology. Regardless of where the shots are fired or the trajectory of the vessel, the seismic survey may continue until a sufficient amount of seismic data has been acquired for an area.

Referring back to method 200, after the seismic data has been acquired during the seismic survey, at step 215 a four-dimensional volume may be created using the seismic data which was acquired during the seismic survey. The four-dimensional volume may be created by a data processing system described further below with respect to FIG. 6. Each of the dimensions of the four-dimensional volume may be from the seismic records themselves or from information recorded along with the seismic records acquired during step 210.

A first dimension of the four-dimensional volume may be trace number. The trace number dimension may contain a number of values equal to the number of receivers along a cable used in the seismic survey system. Consequently, the trace number dimension may contain a number of values equal to the number of seismic records or seismic traces recorded by the receivers along a cable after each shot is fired during the seismic survey. The values in the trace number dimension may be any value sufficient to identify receivers along a cable. For example, the trace number values may be locations (e.g., surface locations) of the receivers, coordinates (e.g., x-y coordinates) of the receivers, sequence numbers, GPS (Global Positioning System) locations of the receivers, or the like.

For example, cable number 1 (cable number 1) in the marine seismic acquisition system 10 illustrated in FIG. 3, may contain a number of receivers represented by the letter N. Thus, the trace dimension may contain N values corresponding to N seismic traces recorded by the N receivers in cable number 1 after each shot is fired.

A second dimension of the four-dimensional volume may be a time dimension related to the recording of seismic records. The time dimension may be used with the trace number dimension to plot the seismic records or seismic traces containing the recorded wavefields within the four-dimensional volume.

Together the first dimension (trace number) and the second dimension (time) may create a shot gather. For example, in FIG. 4, the time dimension is illustrated along the horizontal-axis of the shot gather 400 and the trace number dimension is illustrated along the vertical-axis of the shot gather 400. Thus, the time dimension may be used with the trace numbers to plot the seismic traces recorded by receivers in a cable.

A third dimension of the four-dimensional volume may be shot number. Values in the shot number dimension may correspond to shots fired from a source or sources during a seismic survey. For example, if a number of shots represented by the letter M were fired during a seismic survey of an area, the shot number dimension may have M values. Consequently, the third dimension of the four-dimensional volume may have values ranging from 1 (corresponding to the first shot fired during a seismic survey) to M (corresponding to the last shot fired during a seismic survey). The values in the shot number dimension may be any value sufficient to identify shots fired during the seismic survey. For example, the shot number values may be locations (e.g., surface locations), coordinates (e.g., x-y coordinates) where the shots were fired, sequence numbers, GPS (Global Positioning System) locations where the shots were fired, or the like.

In one implementation, the arrangement or ordering of values along the shot dimension may correspond to when a shot was fired relative to other shots. For example, the first shot number value in the shot dimension may correspond to the first shot fired during a seismic survey, the second shot number value in the shot dimension may correspond to the second shot fired during the seismic survey, etc. However, in other implementations, the arrangement or ordering of values along the shot dimension may correspond to a different criterion. For example, the shots may be arranged in the shot dimension corresponding to a location from which the shots were fired.

Figure 6:
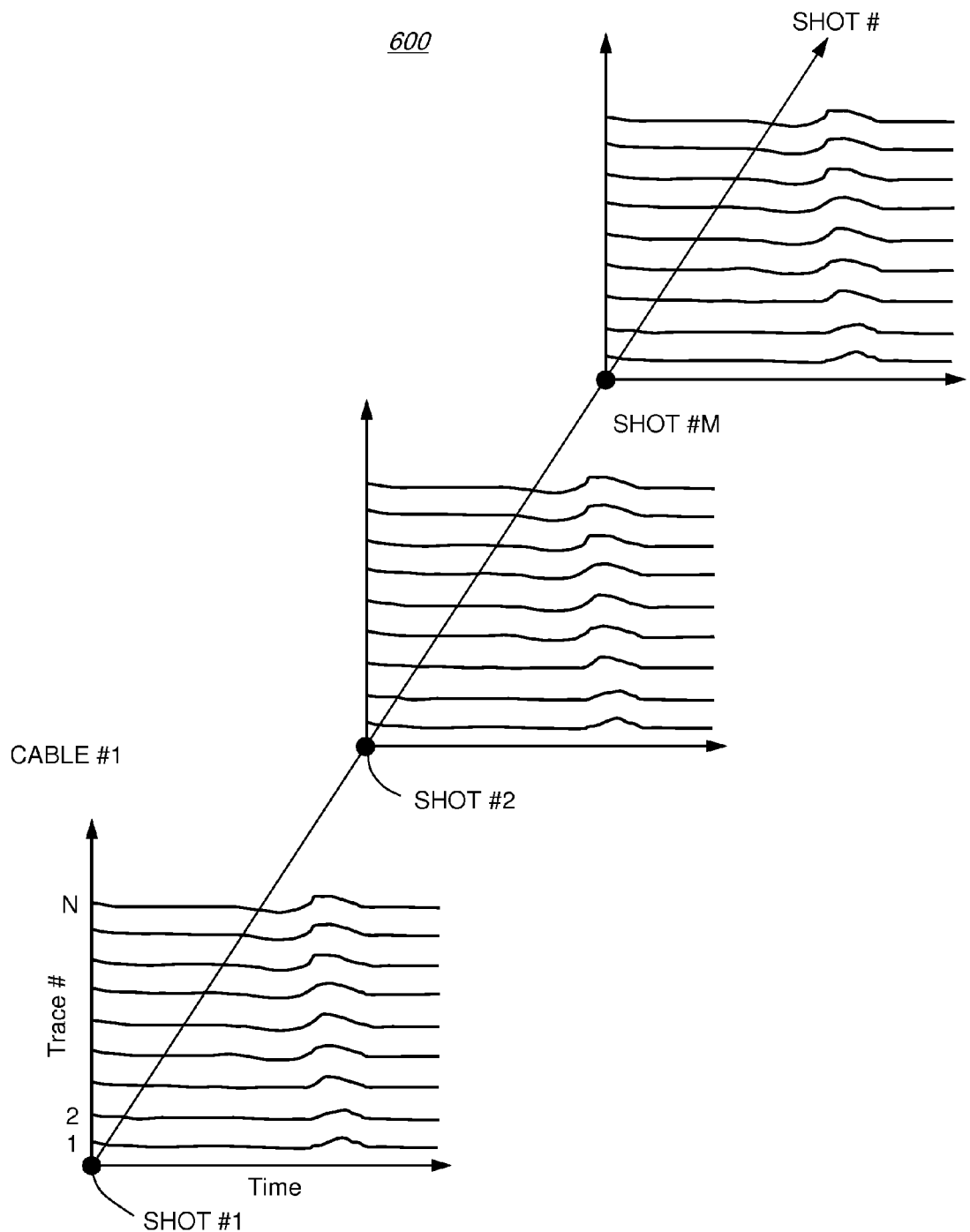

Together the trace number dimension, the time dimension, and the shot number dimension may create a three-dimensional volume of multiple shot gathers. FIG. 6 illustrates a three-dimensional volume 600 created using multiple shot gathers recorded by receivers along a cable. As illustrated, the trace number dimension (vertical axis) and time dimension (horizontal axis) may be used to create shot gathers for different shots fired during a seismic survey. Furthermore, the shot gathers for the different shots may be arranged along a shot dimension (along the shot number axis) to create a three-dimensional volume of multiple shot panels for a cable (e.g., cable number 1).

A fourth dimension of the four-dimensional volume may be cable number. Values in the cable number dimension may correspond to different cables containing receivers and used during the seismic survey. For example, in the seismic acquisition system 10 illustrated in FIG. 3, four cables containing receivers are used (i.e., cable number 1, cable number 2, cable number 3, and cable number 4) to acquire seismic data. Consequently, a four-dimensional volume created using the data from a seismic survey using the seismic survey system 10 may have a fourth or cable dimension having four values.

The values in the cable number dimension may be any value sufficient to identify cables used in the seismic survey. For example, the cable number values may be locations (e.g., surface locations) of the cables, coordinates (e.g., x-y coordinates) of the cables, sequence numbers, GPS (Global Positioning System) locations of the cable, or the like.

Figure 7:
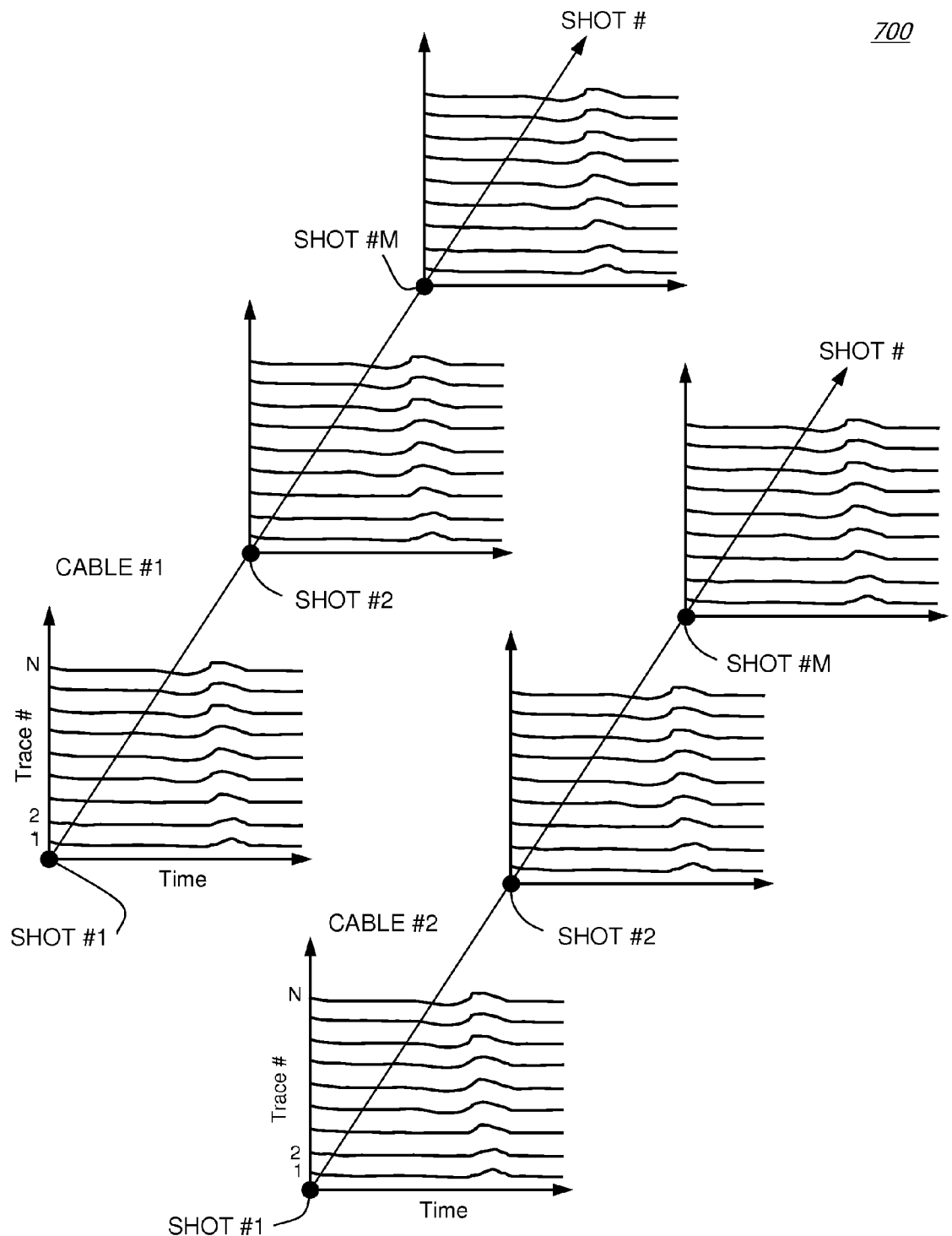

FIG. 7 illustrates an exemplary four-dimensional volume 700 containing multiple shot panels arranged along two shot number dimensions corresponding to two cables (i.e., cable number 1 and cable number 2). Although only two values in the cable dimension are illustrated in FIG. 7, each cable used in the seismic survey may have a corresponding value in the shot number dimension along which shot gathers corresponding to different shots are arranged. The shot gathers may contain the seismic records recorded by receivers along the corresponding cables and the seismic records may be plotted in the shot panels with respect to time.

Referring back to method 200, after building the four-dimensional volume during step 215, the data processing system may apply a noise attenuation filter to the seismic data in the four-dimensional volume. The noise attenuation filter applied to the seismic data in the four-dimensional volume may require each seismic record to be correlated to adjacent or nearby seismic records in other dimensions of the four-dimensional volume in order to not be attenuated by the filter.

The noise attenuation filter may require the seismic records to be correlated to adjacent or nearby seismic records, because noise which affects seismic records may be uncorrelated or appear random when the seismic record is compared to adjacent or nearby seismic records. The noise portion of a record may be random in contrast to the portion of the record which contains information related to the earth's sub-surface. Consequently, the noise attenuation filter may filter the noise portions of seismic records leaving the desired portion of the record which contains information related to the sub-surface unfiltered.

The noise attenuation filter used in step 220 may compare seismic records to adjacent or nearby seismic records in each of the four dimensions of the four-dimensional volume to determine which portions of the seismic signal are not correlated to portions of other seismic records. For example, a seismic record may have been recorded by the second receiver on the second cable in response to the second shot fired during the seismic survey. The noise attenuation filter may compare this seismic record to adjacent seismic records in the four dimensional volume to determine if portions of the seismic record are correlated to portions of the adjacent seismic records.

The adjacent or nearby seismic records may be adjacent or nearby in the shot dimension, the cable dimension, the trace dimension, or the time dimension. For example, an adjacent seismic record may be adjacent to the seismic record in the shot dimension. An adjacent seismic record in the shot dimension may be, for example, a seismic record recorded by the same receiver but in response to a previous or subsequent shot fired during the seismic survey. For the seismic record recorded by the second receiver on the second cable in response to the firing of the second shot, and adjacent record may be one recorded by the same receiver but in response to the first shot or the third shot.

Another adjacent or nearby seismic record may be a seismic record adjacent or nearby in the trace dimension. Adjacent seismic records in the trace dimension may be seismic records recorded by receivers which are adjacent or nearby on the same cable in the seismic survey system and which recorded the seismic records in response to the same shot. For example, for the seismic record recorded by the second receiver on the second cable in response to the firing of the second shot, an adjacent seismic record in the trace dimension may be a seismic record recorded by the first receiver or the third receiver on the second cable and in response to the firing of the second shot.

Similar to adjacent seismic records in the shot dimension and the trace dimension, adjacent or nearby seismic records may also be found in the cable dimension. An adjacent or nearby seismic record in the cable dimension may be a seismic record recorded by receivers in the same receiver position and in response to the same shot but on different cables. For example, for the seismic record recorded by the second receiver on the second cable in response to the firing of the second shot, an adjacent seismic records in the cable dimension may be seismic records recorded by the second receiver on either the first cable or the third cable in response to the firing of the second shot.

Furthermore, the noise attenuation filter may compare seismic records in the time dimension. The noise attenuation filter may compare seismic records in the time dimension by comparing portions of the seismic record to portions of the same seismic record. This comparison may determine if the seismic record is correlated in the time dimension.

If the noise attenuation filter discovers a portion or portions of the seismic record that are not correlated in one or more of the four dimensions, the noise attenuation filter may filter or attenuate the un-correlated portions of the seismic record. The un-correlated portions of the seismic data are likely due to noise due to the random aspects of noise in seismic data.

The noise attenuation filter applied in step 220 may be a coherency filter or a random noise filter which checks for continuity between two objects (e.g., seismic records). Types of coherency filters which may be used in step 220 may be a RNA (random noise attenuation) type filter, an f-xy-decon filter, a median filter, or a bandwidth filter. Furthermore, the filter may be a combination of the aforementioned filters. The filters may be extended such that they compare seismic records in each dimension of the four-dimensional volume.

Furthermore, because the noise attenuation filter may search for un-correlated or incoherent portions of the seismic data, the acquisition of the seismic data may need to be constrained such that the noise attenuation filter does not filter the information about the earth's sub-surface (underlying geology) from the seismic data (seismic records). For example, the distance between the firing of shots may need to be limited to a maximum distance (e.g., 25 meters) or cables may need to be maintained in a relatively straight alignment such that the portion of the seismic data which contains geological information appears continuous or correlated to the filter during step 220. These variations (e.g., shot spacing, cable deformation, etc.) should be slow or small enough such that the geological data or non-noise portion of the seismic data is correlated and not filtered by the noise attenuation filter.

Alternatively or in addition to constraints on the acquisition of the seismic data, such sampling deficiencies may be reduced or eliminated by applying data conditioning steps prior to filtering. Processes such as data interpolation or NMO (normal move out) may be performed between steps 215 and 220, in order to ensure correlation of the geological portions of the seismic data and, thus, prevent the noise attenuation filter from filtering out the geological information from the seismic data or introducing unwanted artifacts.

After filtering or attenuating the noise from the seismic data, the method may proceed to step 225 where method 200 may end. After method 200, the data processing system may use the filtered seismic data for further seismic data processing, may display the filtered seismic data to a user (e.g., on an electronic display device or in a printed plot), or may store the filtered seismic data (e.g., on a hard disk drive) for future use.

Figure 8:
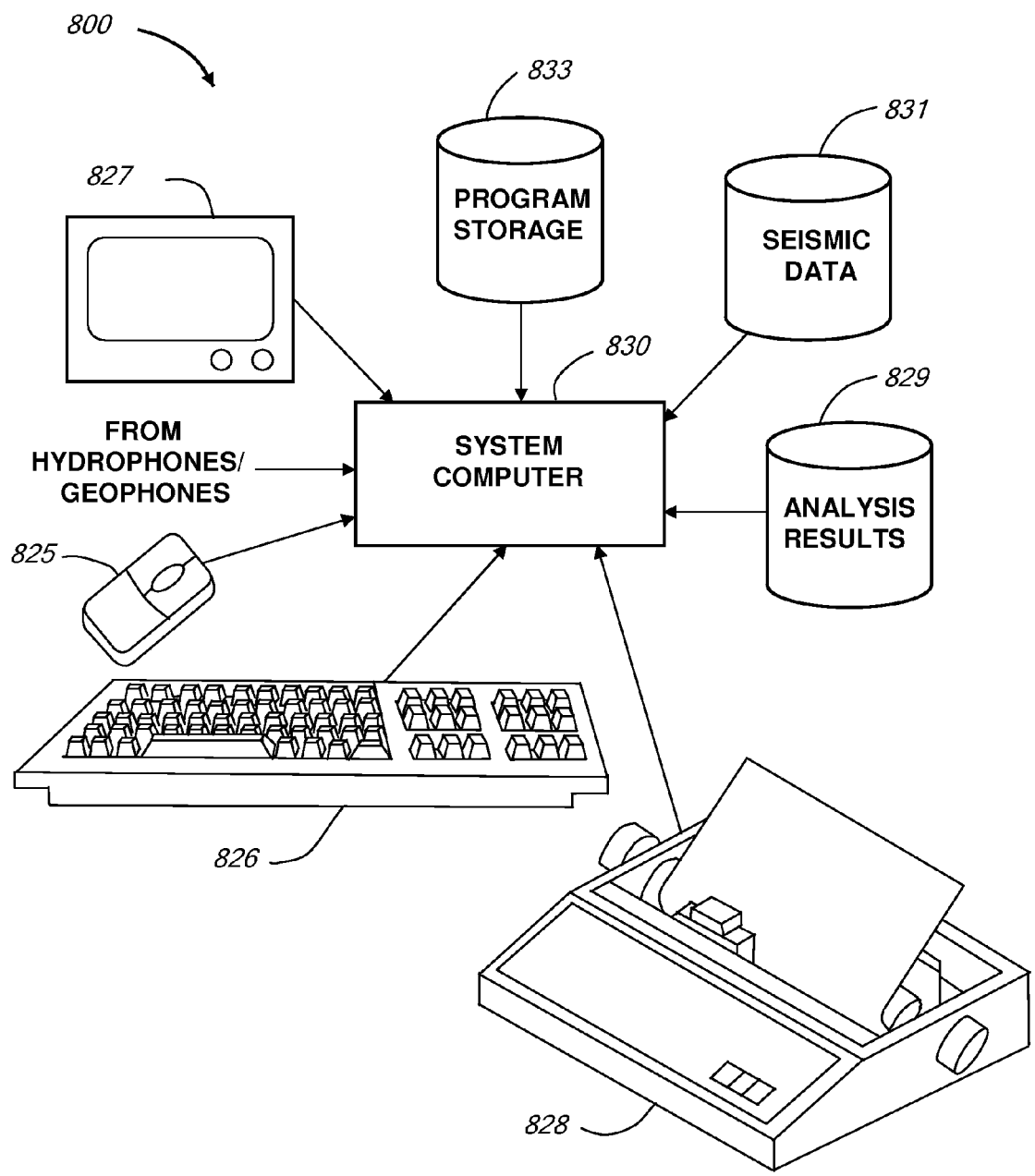
FIG. 8 illustrates an exemplary computer network, in accordance with implementations of various technologies described herein.

FIG. 8 illustrates a computer network 800, into which implementations of various technologies described herein may be implemented. The computer network 800 may include a data processing system or system computer 830, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 830 may be in communication with disk storage devices 829, 831, and 833, which may be external hard disk storage devices. It is contemplated that disk storage devices 829, 831, and 833 are conventional hard disk drives, and as such, will be implemented by way of a local area network or by remote access. Of course, while disk storage devices 829, 831, and 833 are illustrated as separate devices, a single disk storage device may be used to store any and all of the program instructions, measurement data, and results as desired.

In one implementation, seismic data from the receivers may be stored in disk storage device 831. The system computer 830 may retrieve the appropriate data from the disk storage device 831 to process seismic data according to program instructions that correspond to implementations of various technologies described herein. The program instructions may be written in a computer programming language, such as C++, Java and the like. The program instructions may be stored in a computer-readable medium, such as program disk storage device 833. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 830 may present output primarily onto graphics display 827, or alternatively via printer 828. The system computer 830 may store the results of the methods described above on disk storage 829, for later use and further analysis. The keyboard 826 and the pointing device (e.g., a mouse, trackball, or the like) 825 may be provided with the system computer 830 to enable interactive operation.

The system computer 830 may be located at a data center remote from the survey region. The system computer 830 may be in communication with the receivers (either directly or via a recording unit, not shown), to receive signals indicative of the reflected seismic energy. These signals, after conventional formatting and other initial processing may be stored by the system computer 830 as digital data in the disk storage 831 for subsequent retrieval and processing in the manner described above. While FIG. 8 illustrates the disk storage 831 as directly connected to the system computer 830, it is also contemplated that the disk storage device 831 may be accessible through a local area network or by remote access. Furthermore, while disk storage devices 829, 831 are illustrated as separate devices for storing input seismic data and analysis results, the disk storage devices 829, 831 may be implemented within a single disk drive (either together with or separately from program disk storage device 833), or in any other conventional manner as will be fully understood by one of skill in the art having reference to this specification.

Although the various technologies described herein where discussed in reference to marine seismic surveys, the various technologies described herein may also be applicable to land seismic survey, sea-bed seismic survey or any other seismic survey.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for attenuating noise in seismic data that includes a plurality of seismic traces, comprising:
   receiving the plurality of seismic traces, wherein respective seismic traces in the plurality of seismic traces were acquired using respective receivers during a seismic survey;
   forming a four-dimensional volume based at least in part on the plurality of seismic traces, the four-dimensional volume having:
      respective trace numbers that correspond to the respective receivers as a first dimension;
      respective times at which the respective seismic traces were acquired as a second dimension;
      respective shot numbers that correspond to the respective seismic traces as a third dimension;
   respective cable numbers that correspond to the respective seismic traces as a fourth dimension; and
   applying, using a microprocessor, a noise attenuation filter to the four-dimensional volume, wherein applying the noise attenuation filter comprises:
      comparing a seismic trace to an adjacent seismic trace in the four-dimensional volume, wherein the adjacent seismic trace is adjacent to the seismic trace with respect to time, cable number, or combinations thereof; and
   if a portion of the seismic trace is not substantially continuous with a portion of the adjacent seismic trace, attenuating the portion of the seismic trace.

2. The method of claim 1, wherein the respective shot numbers are respective x-y coordinate locations of respective shots fired in the seismic survey used to generate the respective seismic traces, wherein the respective seismic traces are further organized according to the respective x-y coordinate locations of the respective shots; and
   wherein the respective cable numbers are respective x-y coordinate locations of respective cables having the respective receivers that acquired the respective seismic traces, wherein the respective seismic traces are further organized according to the respective x-y coordinate locations of the respective cables.

3. The method of claim 1, wherein the portion of the seismic trace is not substantially continuous with the portion of the adjacent seismic trace if the portion of the seismic trace is not correlated to the portion of the adjacent seismic trace.

4. The method of claim 1, wherein the noise attenuation filter is a random noise attenuation type filter, a median type filter, a f-xy-decon type filter or combinations thereof.

5. A method for attenuating noise in seismic data that includes a plurality of seismic traces, comprising:
   receiving the plurality of seismic traces, wherein respective seismic traces in the plurality of seismic traces were acquired using respective receivers during a seismic survey;
   forming a four-dimensional volume based at least in part on the plurality of seismic traces, the four-dimensional volume having:
      trace number as a first dimension,
      time as a second dimension,
      shot number as a third dimension, and
      cable number as a fourth dimension,
      wherein forming the four-dimensional volume comprises:
         forming one or more two-dimensional shot gathers, the shot gathers comprising the respective seismic traces, wherein the shot gathers have: (i) respective trace numbers as the first dimension, wherein the respective seismic traces are arranged along the first dimension according to locations of the respective receivers which recorded the respective seismic traces, and (ii) respective times as the second dimension, wherein the respective seismic traces are plotted with respect to the respective times at which the respective seismic traces were acquired along the second dimension;
         arranging the one or more two-dimensional shot gathers along respective values of the third dimension according to respective shot numbers that are used to generate the respective seismic traces; and
         arranging the respective values along the fourth dimension according to a respective cable number that corresponds to a respective cable having the respective receivers that acquired the respective seismic traces; and
   applying, using a microprocessor, a noise attenuation filter to the four-dimensional volume, wherein applying the noise attenuation filter comprises:
      comparing a seismic trace to adjacent seismic traces in each of the four dimensions of the four-dimensional volume; and
      if a portion of the seismic trace is not substantially continuous with a portion of the adjacent seismic traces, attenuating the portion of the seismic trace.

6. The method of claim 5, wherein the portion of the seismic trace is not substantially continuous with the portion of the adjacent seismic traces if the portion of the seismic trace is not correlated to the portion of each of the adjacent seismic traces.

7. The method of claim 5, wherein the two-dimensional shot gathers are arranged along the one or more values according to times when shots were fired.

8. The method of claim 5, wherein the two-dimensional shot gathers are arranged along the one or more values according to locations where shots were fired.

9. A method for attenuating noise in seismic data, comprising:
   receiving the seismic data;
   forming a four-dimensional volume using the seismic data, the four-dimensional volume having:
      trace number as a first dimension,
      time as a second dimension,
      shot number as a third dimension, and
      cable number as a fourth dimension;
   comparing a seismic trace to an adjacent seismic trace in the four dimensional volume; and
   if a portion seismic trace is not substantially continuous with a portion of the adjacent seismic trace, attenuating the portion of the seismic trace.

10. The method of claim 9, wherein the seismic trace is recorded by a first receiver on a first cable in response to a first shot; and wherein the adjacent seismic trace is a seismic trace recorded by the first receiver, a seismic trace recorded by a receiver on the first cable, a seismic trace recorded in response to the first shot or combinations thereof.

11. The method of claim 9, wherein the portion of the seismic trace is not substantially continuous with the portion of the adjacent seismic trace if the portion of the seismic trace is incoherent with respect to the portion of the adjacent seismic trace.

12. A non-transitory computer-readable medium having stored thereon computer-executable instructions which, when executed by a computer, cause the computer to perform operations comprising:
receiving a plurality of seismic traces, wherein respective seismic traces in the plurality of seismic traces were acquired using respective receivers during a seismic survey;
forming a four-dimensional volume based at least in part on the plurality of seismic traces, the four-dimensional volume having:
respective trace numbers that correspond to the respective receivers as a first dimension;
respective times at which the respective seismic traces were acquired as a second dimension;
respective shot numbers that correspond to the respective seismic traces as a third dimension; and
respective cable numbers that correspond to the respective seismic traces as a fourth dimension; and
applying a noise attenuation filter to the four-dimensional volume, wherein applying the noise attenuation filter comprises:
comparing a seismic trace to an adjacent seismic trace in the four-dimensional volume, wherein the adjacent seismic trace is adjacent to the seismic trace with respect to time, cable number, or combinations thereof; and
if a portion of the seismic trace is not substantially continuous with a portion of the adjacent seismic trace, attenuating the portion of the at least one seismic trace.

13. A non-transitory computer-readable medium having stored thereon computer-executable instructions which, when executed by a computer, cause the computer to perform operations comprising:
forming a four-dimensional volume based at least in part on a plurality of seismic traces, wherein respective seismic traces in the plurality of seismic traces were acquired using respective receivers during a seismic survey, the four-dimensional volume having:
trace number as a first dimension,
time as a second dimension,
shot number as a third dimension, and
cable number as a fourth dimension,
wherein forming the four-dimensional volume comprises:
forming one or more two-dimensional shot gathers, the shot gathers having the respective seismic traces, wherein the shot gathers have: (i) trace number as the first dimension, wherein the respective seismic traces are arranged along the first dimension according to locations of the respective receivers which recorded the respective seismic traces, and (ii) time as the second dimension, wherein the respective seismic traces are plotted with respect to respective times at which the respective seismic traces were acquired along the second dimension;
arranging the one or more two-dimensional shot gathers along respective values of the third dimension according to respective shot numbers that are used to generate the respective seismic traces; and
arranging the respective values along the fourth dimension according to a respective cable number that corresponds to a respective cable having the respective receivers that acquired the respective seismic traces; and applying a noise attenuation filter to the four-dimensional volume, wherein applying the noise attenuation filter comprises:
comparing a seismic trace to adjacent seismic traces in each of the four dimensions of the four dimensional volume; and
if a portion of the seismic trace is not substantially continuous with a portion of the adjacent seismic traces, attenuating the portion of the seismic trace.

14. A non-transitory computer-readable medium having stored thereon computer-executable instructions which, when executed by a computer, cause the computer to perform operations comprising:
receiving seismic data;
forming a four-dimensional volume using the seismic data, the four-dimensional volume having:
trace number as a first dimension,
time as a second dimension,
shot number as a third dimension, and
cable number as a fourth dimension;
comparing a seismic trace to an adjacent seismic trace in the four dimensional volume; and
if a portion of the seismic trace is not substantially continuous with a portion of the adjacent seismic trace, attenuating the portion of the seismic trace.

15. The non-transitory computer readable medium of claim 14, wherein the seismic trace is recorded by a first receiver on a first cable in response to a first shot; and wherein the adjacent seismic trace is a seismic trace recorded by the first receiver, a seismic trace recorded by a receiver on the first cable, a seismic trace recorded in response to the first shot or combinations thereof.

16. A computer system, comprising:
a processor; and
a memory comprising program instructions executable by the processor to:
receive seismic data acquired using one or more receivers during a seismic survey;
form a four-dimensional volume using the seismic data, the four-dimensional volume having:
one or more trace numbers that correspond to the receivers as a first dimension,
one or more times at which one or more traces in the seismic data that correspond to the trace numbers were acquired as a second dimension,
one or more shot numbers that correspond to the trace numbers as a third dimension, and
one or more cable numbers that correspond to the trace numbers as a fourth dimension;
compare a seismic trace to an adjacent seismic trace in the four-dimensional volume, wherein the adjacent seismic trace is adjacent to the seismic trace with respect to time, cable number, or combinations thereof; and
if a portion of the seismic trace is not substantially continuous with a portion of the adjacent seismic trace, attenuate the portion of the seismic trace.

17. A computer system, comprising:
a processor; and
a memory comprising program instructions executable by the processor to:
receive seismic data;
form a four-dimensional volume using the seismic data, the four-dimensional volume having:
trace number as a first dimension,
time as a second dimension, shot number as a third dimension, and
cable number as a fourth dimension,
wherein the instructions to form the four-dimensional volume are configured to:
form one or more two-dimensional shot gathers, the shot gathers having one or more seismic traces recorded by one or more receivers, wherein the shot gathers have: (i) trace number as the first dimension, wherein the seismic traces are arranged along the first dimension corresponding to locations of the receivers which recorded the seismic traces, and (ii) time as the second dimension, wherein the seismic traces are plotted with respect to time along the second dimension;
arrange the one or more two-dimensional shot gathers along one or more values of the third dimension according to shot number;
arrange the one or more values along the fourth dimension according to cable number;
compare a seismic trace to adjacent seismic traces in each of the the four dimensions of the four dimensional volume; and
if a portion of the seismic trace is not the substantially continuous with a portion of the adjacent seismic traces, attenuate the portion of the seismic trace.

18. The computer system of claim 17, wherein the two-dimensional shot gathers are arranged along the one or more values according to locations where shots were fired.

19. A computer system, comprising:
a processor; and
a memory comprising program instructions executable by the processor to:
receive seismic data;
form a four-dimensional volume using the seismic data, the four-dimensional volume having:
trace number as a first dimension,
time as a second dimension,
shot number as a third dimension, and
cable number as a fourth dimension;
compare a seismic trace to an adjacent seismic trace in the four dimensional volume; and
if a portion of the seismic trace is not substantially continuous with a portion of the adjacent seismic trace, attenuate the portion of the seismic trace.

20. The computer system of claim 19, wherein the seismic trace is recorded by a first receiver on a first cable in response to a first shot; and wherein the adjacent seismic trace is a seismic trace recorded by the first receiver, a seismic trace recorded by a receiver on the first cable, a seismic trace recorded in response to the first shot or combinations thereof.

* * * * *